(12) United States Patent
Miura

(10) Patent No.: US 6,214,241 B1
(45) Date of Patent: Apr. 10, 2001

(54) METHOD FOR TREATING AN EFFLUENT CONTAINING SORBIC ACID AND/OR A SALT THEREOF AND AN EFFLUENT DISPOSAL DEVICE

(75) Inventor: Hiroshi Miura, Arai (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/209,291

(22) Filed: Dec. 11, 1998

(30) Foreign Application Priority Data

Dec. 17, 1997 (JP) .................................................. 9-364514
Dec. 26, 1997 (JP) .................................................. 9-367689
Jan. 20, 1998 (JP) .................................................. 10-023871

(51) Int. Cl.[7] ...................................................... C02F 1/76
(52) U.S. Cl. ........................... 210/753; 210/755; 210/756
(58) Field of Search .................................. 210/756, 755, 210/754, 753

(56) References Cited

U.S. PATENT DOCUMENTS

| 3,707,770 | | 1/1973 | Timmins et al. . |
| 3,876,536 | | 4/1975 | Pradt et al. . |
| 4,155,975 | * | 5/1979 | Riley . |
| 4,160,656 | * | 7/1979 | Junkermann . |
| 5,054,434 | * | 10/1991 | Wax et al. . |

FOREIGN PATENT DOCUMENTS

| 0473290A2 | 3/1992 | (EP) . |
| 0473459A2 | 3/1992 | (EP) . |
| 0608200A1 | 7/1994 | (EP) . |

OTHER PUBLICATIONS

Chemical Abstracts, vol. 77, No. 14, Oct. 2, 1972, Abstract No. 92558d.
Chemical Abstracts, vol. 76, No. 10, Mar. 6, 1972, Abstract No. 49590a.

* cited by examiner

Primary Examiner—Chester T. Barry
(74) Attorney, Agent, or Firm—Birch, Stewart, Kolasch & Birch, LLP

(57) ABSTRACT

An effluent containing sorbic acid or its salt from, for example, a sorbic acid production line is (1) treated with a hypohalogenous acid or its salt, e.g. sodium hypochlorite, or (2) subjected to membrane separation or activated carbon treatment and further to biological treatment such as activated sludge treatment. The required amount of the hypohalogenous acid or salt may for example be about 0.01–10 parts by weight, in terms of effective halogen, based on 100 parts by weight of the effluent. Optionally the effluent thus treated with the hypohalogenous acid or salt is further subjected to a biological treatment such as an activated sludge process.

16 Claims, No Drawings

METHOD FOR TREATING AN EFFLUENT CONTAINING SORBIC ACID AND/OR A SALT THEREOF AND AN EFFLUENT DISPOSAL DEVICE

FIELD OF THE INVENTION

The present invention relates to a method of treating an effluent containing sorbic acid and/or its salt from a sorbic acid (inclusive of its salt) production line, a method of reducing the BOD of said effluent, and an effluent disposal device for use in the treatment of said effluent.

BACKGROUND OF THE INVENTION

Sorbic acid and its salts (e.g. potassium salt) are antifungal and effective in preserving food so that they are in broad use as food additives.

The representative commercial technology for the production of sorbic acid or a salt thereof comprises reacting crotonaldehyde with ketene to give a polyester, decomposing the polyester with an acid or alkali to give sorbic acid or a salt thereof in crude form, and purifying the crude sorbic acid or salt by crystallization. This crystallization is generally effected by dissolving said crude sorbic acid or salt in hot water and cooling the solution to cause sorbic acid or its salt to separate out or by dissolving said crude sorbic acid in an aqueous alkaline solution to give an alkali metal sorbate solution and adjusting the solution to pH about 2–3 with an acid such as hydrochloric acid to thereby cause sorbic acid crystals to separate out.

In the above production process, large amounts of effluents containing sorbic acid or its salt are formed in the step of producing crude sorbic acid from said polyester and the subsequent crystallization step. For example, in the step where the polyester is decomposed with hydrochloric acid to give crude sorbic acid, the filtrate after recovery of sorbic acid contains not only organic matter inclusive of sorbic acid and reaction byproducts but also tarry matter so that its BOD (biological oxygen demand) is of the order of tens of thousands to hundreds of thousands parts per million (ppm). Moreover, said organic matter may comprise as many as 50 or more different substances. The filtrate in said crystallization step also contains sorbic acid or its salt and substantially the same amount of other organic matter (about 30–40 kinds of substances) and its BOD is as high as 2000–10000 ppm. Incidentally, the solubility of sorbic acid in water is about 0.1–0.3 weight % at room temperature, although it is increased to about 3 weight % at elevated temperature.

Generally, these effluents are subjected to an activated sludge or other biological treatment and then allowed to drain into a public waterway. However, the effluent from the above sorbic acid production and purification line has such a high BOD value that the load on the biological treatment system is large and therefore, its disposal requires an enormous equipment and running expenditure.

As alternative technologies for the production of sorbic acid, there are known the process which comprises decomposing γ-vinyl-γ-butyrolactone and the process which comprises decomposing acetoxyhexenoic acid which is the reaction product of butadiene with acetic acid. However, in these processes, too, large volumes of effluents containing sorbic acid or its salt are discharged in the production and purification stages, thus presenting the same problems as mentioned above.

Meanwhile, there has been reported a method which comprises acidifying a dilute aqueous solution of sorbic acid or its salt, concentrating it to about 5-fold the initial concentration by the reverse osmosis technique, and recovering sorbic acid or its salt from said aqueous solution. However, the membrane effluent shows a high BOD value and cannot be directly allowed to drain into a public waterway.

SUMMARY OF THE INVENTION

It is, therefore, an object of the present invention to provide a method for efficient reduction of the BOD of an effluent containing sorbic acid or its salt.

It is another object to provide a method for efficiently reducing the load on the biological system for the treatment of an effluent containing sorbic acid or its salt.

It is still another object of the invention to provide an effluent disposal device by which the BOD of an effluent containing sorbic acid and/or its salt can be efficiently reduced.

The inventor of the present invention did an intensive investigation for accomplishing the above objects and found that the BOD of an effluent containing sorbic acid and/or its salt can be remarkably reduced by subjecting the effluent to the herein-disclosed specific step(s). The present invention has been developed on the basis of the above finding.

The present invention, therefore, provides a method of treating an effluent containing sorbic acid and/or its salt which comprises a step of treating said effluent with a hypohalogenous acid or a salt thereof. This treatment technology optionally includes a step in which the effluent treated with said hypohalogenous acid or salt is further subjected to a biological treatment.

The present invention further provides a method of treating an effluent containing sorbic acid and/or its salt which comprises a step of subjecting said effluent to membrane separation or to activated carbon treatment, and a step of subjecting the membrane downstream fluid (filtrate) or the activated carbon-treated effluent to biological treatment.

In the above method, the membrane separation may be performed with a nanofiltration membrane. Furthermore, the effluent containing sorbic acid and/or its salt may be adjusted to pH 7 or higher in advance of the membrane separation.

The present invention in another aspect provides a method of reducing the BOD of an effluent containing sorbic acid and/or its salt which comprises (1) treating said effluent with a hypohalogenous acid or a salt thereof, or (2) subjecting said effluent to membrane separation or activated carbon treatment and then to biological treatment.

The invention in still another aspect provides an effluent disposal device comprising a means of treating an effluent containing sorbic acid and/or its salt with a hypohalogenous acid or a salt thereof.

The present invention further provides an effluent disposal device comprising (1) a membrane separation means for separating an effluent containing sorbic acid and/or its salt or a means for treating the effluent with activated carbon, and (2) a biological means for treating the membrane downstream fluid (filtrate) or the activated carbon-treated effluent biologically.

DETAILED DESCRIPTION OF THE INVENTION

The present invention is characterized in that an effluent containing sorbic acid and/or its salt is treated with a hypohalogenous acid or a salt thereof.

The effluent containing sorbic acid and/or its salt (hereinafter sometimes referred to as sorbic acid or equivalent) is not particularly restricted insofar as it is an effluent containing sorbic acid or equivalent as discharged from a sorbic acid (or equivalent) production line (inclusive of a purification stage). Thus, said effluent includes but is not limited to the (aqueous) effluent from the process in which the polyester obtained by reacting crotonaldehyde with ketene is decomposed to provide sorbic acid or equivalent, the effluent from the process which comprises decomposing γ-vinyl-γ-butyrolactone to provide sorbic acid, and the effluent from the process in which acetoxyhexenoic acid as the reaction product of butadiene with acetic acid is decomposed to provide sorbic acid.

The salt of sorbic acid includes salts with alkali metals (e.g. sodium salt, potassium salt, etc.), salts with alkaline earth metals (e.g. magnesium salt, calcium salt, strontium salt, barium salt, etc.), salts with transition metals, and other metal salts.

Hypohalogenous acid may for example be hypochlorous acid, hypobromous acid, or hypoiodous acid. The salt of hypohalogenous acid includes salts with alkali metals (e.g. sodium salt, potassium salt, etc.), salts with alkaline earth metals (e.g. calcium salt, strontium salt, barium salt, etc.), salts with transition metals, and other metal salts. The hypohalogenous acid or a salt thereof which can be employed generally is hypochlorous acid or its salt (e.g. an alkali metal hypochlorite such as sodium hypochlorite or an alkaline earth metal hypochlorite such as calcium hypochlorite). Those hypohalogenous acids and their salts can be used each independently or in a combination of two or more species.

The level of use of said hypohalogenous acid or salt thereof can be liberally selected according to the type of hypohalogenous acid or salt thereof and the concentration of sorbic acid or equivalent in the effluent to be treated. However, based on 100 parts by weight of the effluent, the usual level of use may for example be not less than 0.01 part by weight (e.g. about 0.01–10 parts by weight), preferably not less than 0.08 part by weight (e.g. about 0.08–2 parts by weight), more preferably about 0.15–0.5 part by weight, all in terms of effective halogen. When, for example, an aqueous solution of hypochlorous acid or a salt thereof with an effective chlorine concentration of about 10–15 weight % is used, the recommended amount of the solution relative to 100 parts by weight of the effluent is about 0.1–50 parts by weight, preferably about 1–20 parts by weight. Even when the proportion of said aqueous solution is only about 2–5 parts by weight to 100 parts by weight of the effluent, the BOD of the effluent can be reduced to, for example, 40–55%.

The means of treating an effluent containing sorbic acid and/or its salt with a hypohalogenous acid or a salt thereof may be any means by which the effluent can be brought into contact with said hypohalogenous acid or salt thereof, an example being a tank having a mixing device such as a stirrer. This treatment means may include a means for admitting the effluent, a means for feeding said hypohalogenous acid or salt thereof, a means for discharging the treated effluent, and a temperature regulating means.

The treatment temperature and time can be judiciously selected taking into consideration the concentration of sorbic acid or equivalent in the effluent and the efficiency of treatment, among other factors. The treatment temperature is generally 0–60° C. and preferably about 10–40° C. (e.g. room temperature). The treatment time is generally about 5 minutes to about 10 hours and, in many cases, about 30 minutes to about 2 hours. The mode of treatment may be batchwise or continuous.

When an effluent containing sorbic acid or equivalent (for example the effluent from a sorbic acid production process) is treated with a hypohalogenous acid or a salt thereof, the BOD of the effluent is remarkably reduced probably because the sorbic acid and its salt as well as the byproducts formed in the course of sorbic acid production are converted to substances with low BOD values.

The effluent thus treated with a hypohalogenous acid or a salt thereof may, provided that it clears the waste water control law and regulations, be allowed to drain into a public waterway. Usually, however, the treated effluent is further subjected to a biological treatment utilizing the metabolic activity of microorganisms (e.g. bacteria, algae, protozoa, or metazoa). The means for biological treatment includes but is not limited to an activated sludge and a biomembrane. In such a biological treatment system, fungi emerge and then small metazoa (e.g. nematodes, rotifers, and insects) follow suit according to a food cycle. As a result, the biological treatment system is brought into functioning by the whole activity of such microbial life. The consequence is that owing to the above activity of microbial life, the organic matter in the effluent is converted to harmless (or substantially harmless) substances such as carbon dioxide gas and water. The conditions of this biological treatment maybe the routine conditions for waste water disposal.

Another method in the present invention is characterized in that an effluent containing sorbic acid and/or its salt is treated by a combination of two steps, namely (1) a membrane filtration (or separation) step or an activated carbon treatment step and (2) a biological treatment step.

The membrane for use in the membrane separation step may be any of the conventional membranes for separation of solutes in a solution. Among such separatory membranes are ultrafiltration membranes (cutoff molecular weights ca 1000–3,000,000), nanofiltration membranes (cutoff molecular weights ca a few hundred—a few thousand, e.g. ca 200–2000, preferably ca 200–1000), and reverse osmosis membranes (cutoff molecular weights ca 60–350).

In the context of the present invention, the preferred separation membrane is a membrane for reverse osmosis or a nanofiltration membrane. With such a membrane, the organic matter in an effluent from a sorbic acid (or equivalent) production line can be removed with remarkably high efficiency. The reverse osmosis membrane includes membranes with sodium chloride elimination (cutoff) rates exceeding 90%. The nanofiltration membrane which can be used includes membranes with sodium chloride elimination rates from about 5 to 90%, preferably about 10–85% (e.g. ca 80%, ca 45%, or ca 40%).

The membrane for reverse osmosis is classified, by membrane material, into cellulose membranes (acetylcellulose asymmetric membrane, acetylcellulose composite membrane, acetylcellulose hollow fiber membrane, etc.), the non-cellulosic membranes (aromatic polyamide hollow fiber membrane, composite membrane, etc.), and the inorganic membranes (porous glass membrane, molecular sieve membrane, etc.). The nanofiltration membranes includes composite membranes (DRA-40, 45, 80, etc. from Daicel Chemical; NF-45, 70, etc. from Dow Chemical; G-50, 20, Desal-5, etc. from Sanko Shokai), modified polyamide composite membranes (Desal-5K, 5L, etc. from Sanko Shokai), cellulose acetate membranes (NF-CA30 etc. from Hoechst), polyether sulfone membranes (NF-PES10 etc. from Hoechst), sulfonated polyether sulfone membranes (NTR-7410, 7430, 7450, etc. from Nitto Denko), polyvinyl alcohol-polyamide membranes (NTR-7250 etc.), and polyamide membranes (UTC-60HF, UTC-20HF, etc. from Toray), among others.

In the above-mentioned sorbic acid (or equivalent) production process, an acid and an alkali are used for decomposition of the intermediate product polyester and pH adjustment in the crystallization step, with the result that inorganic matter such as sodium chloride is produced and tends to find its way into the effluent at the level of, for example, about 2–10%. The inorganic matter does not usually contribute directly to BOD. When a nanofiltration membrane is used as the separation membrane, the above-mentioned inorganic matter partially passes through the membrane so that the separation procedure need not be carried out at elevated pressure and, hence, the equipment cost can be decreased and the useful life of the membrane be extended. Therefore, the membrane separation of an effluent containing inorganic salts can be carried out with advantage using a nanofiltration membrane, particularly a nanofiltration membrane with a low sodium chloride elimination rate (e.g. ca 5–60%), that is to say a nanofiltration membrane capable of selective removal of organic matter.

The effluent containing sorbic acid or equivalent may be directly subjected to membrane separation but if the pH of the effluent is less than 7, it is preferably adjusted to pH 7 or higher in advance of its submission to the membrane separation step. The pH of the effluent to be fed to the membrane separation stage is preferably about 7–12 and more preferably about 8–11.5. Incidentally, the neutralization point of sorbic acid is pH 8.5. If an effluent with a pH value of less than 7 is subjected to membrane separation, sorbic acid will separate out to increase the risk for clogging of the membrane and the rate of removal of organic solutes tends to be decreased. Moreover, an effluent containing a tarry matter tends to clog the membrane if its pH is low and, therefore, such effluent is preferably adjusted to about pH 10–12, particularly about 10–11.5, in advance. If the pH of the effluent is higher than 12, the membrane life will be shortened.

The membrane separation means to be used in said membrane separation step may be a conventional membrane separation device equipped with the above-described separation membrane. Thus, the construction of the membrane separation equipment may be any of the planar (flat) type, coil type, tubular type, and hollow fiber type.

The operating temperature to be used in said membrane separation step can be selected from the range in which the efficiency of separation is not sacrificed but is generally about 10–80° C., preferably about 15–60° C., and more preferably about 20–40° C. The operating pressure can be selected taking into consideration the kind of membrane used and the efficiency of separation. For example, the operating pressure for a nanofiltration membrane may for example be about 3–30 kgf/cm$^2$, preferably about 10–25 kgf/cm$^2$, and usually about 15–25 kgf/cm$^2$. In case a synthetic composite nanofiltration membrane, e.g. MOLSEP® DRA-40 from Daisen Membrane Systems, is used, for instance, the organic matter can be efficiently removed at a pressure of 20 kgf/cm$^2$. When a membrane for reverse osmosis is used as the separation membrane, the operating pressure may for example be about 40–90 kgf/cm$^2$.

The membrane separation step may be carried out batchwise or continuously.

As the effluent from a sorbic acid (or equivalent) production line is subjected to membrane separation, about 60–85% of the sorbic acid and other organic matter is removed and about 80–95% of BOD load is eliminated.

From the concentrate (upstream fluid, i.e. the fraction not passing through the membrane) obtained in the membrane separation step, sorbic acid or its salt can be recovered by a conventional procedure such as crystallization or recrystallization.

The activated carbon treatment step comprises bringing an effluent containing sorbic acid or equivalent, which usually contains other organic matter as well, into contact with activated carbon.

The activated carbon mentioned above is not particularly restricted but includes many kinds of activated carbons regardless of the precursor materials and/or activation processes used, or morphologies. For example, said activated carbon may be an activated carbon of the mineral origin or the plant origin, or one derived from synthetic resin. As classified by activation process, steam-activated carbons (e.g. Shirasagi®, Takeda Chemical Industries, Ltd.) and chemical-activated carbons such as zinc chloride-activated carbons (e.g. Carboraffin®, Takeda Chemical Industries, Ltd.), for instance, can be employed. Morphologically, the activated carbon may be of any suitable shape, thus including powdery carbon and granular carbon, among others.

In terms of activation process, the preferred carbon is a steam-activated carbon, which is highly effective in removing sorbic acid and reducing BOD. In terms of morphology, powdery carbons are among preferred species.

The level of addition of activated carbon varies with different compositions (sorbic acid contents) of the effluent to be treated but is generally 0.01–10 parts by weight, preferably about 0.1–5 parts by weight, based on 100 parts by weight of the effluent. However, the object of the invention can be sufficiently accomplished at the level of about 0.5–3 parts by weight.

The temperature and time of activated carbon treatment are not particularly critical but can be judiciously selected according to the composition of the effluent, for instance. Usually, however, the treatment temperature is about 10–100° C. (e.g. about 15–80° C.) and the treatment time is about 0.1–10 hours (e.g. about 0.5–1 hour). The relatively hot effluent from a sorbic acid production line can be directly subjected to activated carbon treatment without cooling.

The mode of activated carbon treatment may be continuous or batchwise and can be selected according to the condition of drainage from the production line.

The treatment means which can be used in the activated carbon treatment step includes various alternative means for bringing the activated carbon into contact with the effluent. Thus, said means may for example be a tank equipped with a mixing device (a stirring means, a shaking means, etc.). When granular activated carbon or the like is used, a column packed with the carbon can be employed.

When an effluent from a sorbic acid (or equivalent) production line is subjected to activated carbon treatment, about 50–99% of the sorbic acid or equivalent and other organic matter are removed from the effluent and about 50–80% of the BOD load is eliminated. Particularly in regard to sorbic acid or its salt, 70–99% or even more can be removed.

After the activated carbon has been brought into contact with the effluent, the carbon is separated from the effluent by a routine separation procedure and the latter is subjected to the next treatment.

Incidentally, the sorbic acid or salt can be efficiently recovered from the separated carbon by subjecting the carbon to a conventional carbon regeneration (desorption) procedure such as treatment with an aqueous alkaline solution or steam to desorb sorbic acid or its salt and subjecting the acid or salt to a conventional purification procedure such as crystallization or recrystallization.

The filtrate separated in the above membrane separation step or the effluent treated with activated carbon in the above manner is further subjected to a biological treatment utilizing the metabolic activity of microorganisms (e.g. bacteria, algae, protozoa, or metazoa). The means for biological treatment and the conditions of this biological treatment are the same as the above.

When an effluent containing sorbic acid or equivalent is thus treated with a hypohalogenous acid or a salt thereof or thus subjected to membrane separation or activated carbon treatment, and further subjected to such a biological treatment, the BOD elimination rate is remarkably enhanced as compared with the case in which a similar effluent containing sorbic acid or equivalent is directly subjected to the biological treatment. For example, whereas the BOD elimination rate is about 70–80% when an effluent containing 0.1–0.4% of sorbic acid is directly subjected to a biological treatment (e.g. by an activated sludge method), the BOD elimination rate in the biological treatment can be increased to 95% or more by treating the effluent with a hypohalogenous acid or a salt thereof beforehand or subjecting to membrane separation or activated carbon treatment beforehand, and subjecting the thus-pretreated effluent to the biological treatment. The reason for this remarkable effect is considered to be as follows. Sorbic acid and its salt have antifungal and antibacterial activities. Therefore, if an effluent containing sorbic acid or equivalent is directly subjected to a biological treatment, growth of the microorganisms is inhibited so that the BOD reducing effect of the biological treatment, which depends on the metabolic activities of microorganisms, is compromised. In contrast, when the effluent containing sorbic acid or equivalent is previously treated with a hypohalogenous acid or a salt thereof, the sorbic acid or equivalent is converted to substances with little or no antimicrobial activity under the action of said hypohalogenous acid or salt. When the effluent containing sorbic acid or equivalent is previously subjected to membrane fractionation or treated with activated carbon, the growth-inhibitory substances inclusive of sorbic acid or equivalent are selectively eliminated with good efficiency. In consequence, the metabolic activities of microorganisms will not be inhibited even if the effluent is subjected to the biological treatment.

Since, in accordance with the invention, an effluent containing sorbic acid or equivalent is treated with a hypohalogenous acid or a salt thereof, not only the BOD of the effluent can be remarkably reduced but also the BOD elimination rate in the biological treatment stage can be significantly improved. More specifically, when the treatment with a hypohalogenous acid or a salt thereof and a biological treatment are applied in combination, the BOD of the effluent can be reduced to about $1/5$–$1/10$ as compared with the conventional effluent disposal system relying on a biological treatment alone.

Further, according to the invention, the effluent containing sorbic acid or equivalent is subjected to membrane separation and further to biological treatment with the result that an effluent BOD elimination rate as high as, for example, about 99–99.9% is achieved. In other words, as compared with the conventional technology depending on a microbial treatment alone, the BOD of the effluent can be reduced to about $1/30$–$1/100$.

Furthermore, according to the invention, the effluent containing sorbic acid and/or its salt is subjected to activated carbon treatment and further to biological treatment with the result that an effluent BOD elimination rate as high as, for example, about 95–99.9% is achieved. In other words, as compared with the conventional technology depending on a microbial treatment alone, the BOD of the effluent can be reduced to about $1/50$.

In accordance with the method of the present invention, the BOD of an effluent containing sorbic acid or equivalent can be efficiently reduced. Moreover, the load on a biological system for the treatment of the effluent containing sorbic acid or equivalent can be efficiently decreased.

With the effluent disposal device according to the invention, the BOD of the effluent containing sorbic acid and/or a salt thereof can be expediently reduced.

EXAMPLES

The following examples illustrate the present invention in further detail without delimiting the scope of the invention. In the examples, the analysis for sorbic acid and other organic matter was performed by high performance liquid chromatography. The activated sludge treatment was carried out using AS-Treater (Model AS-10, Miyamoto Seisakusho).

Example 1

Preparation of an effluent

To 100 parts by weight of the polyester obtained by reacting crotonaldehyde with ketene was added 380 parts by weight of concentrated hydrochloric acid, and the mixture was heated at 60° C. for 2 hours to decompose the polyester. This reaction mixture was cooled to room temperature to cause crude sorbic acid to separate out. The crude crystals thus obtained were recovered by filtration and rinsed with water. The filtrate and aqueous washes were combined to provide Effluent A.

To 100 parts by weight of the crude sorbic acid crystals obtained above was added 95 parts by weight of an aqueous solution containing 25 weight % of sodium hydroxide, and the mixture was heated with stirring to dissolve the crystals. The resulting solution was mixed with 5 parts by weight of activated carbon. The carbon was then filtered off and the filtrate was adjusted to pH 2–3 with concentrated hydrochloric acid and cooled to room temperature, whereupon sorbic acid separated out. This crop of sorbic acid crystals was recovered by filtration and the filtrate was used as Effluent B.

The above Effluent A and Effluent B were blended in a weight ratio of A:B=1:10 and the mixture was regarded as the effluent from a sorbic acid production line and submitted to the following experiment.

Hypochlorite treatment

A tank equipped with a stirrer was charged with 100 parts by weight of the above effluent from a sorbic acid production line and a varying amount (3 levels indicated in Table 1) of an aqueous solution of sodium hypochlorite (effective chlorine content 12.9 weight %) and the mixture was stirred for 1 hour. The sorbic acid and other organic contents of the treated effluents and the BOD values of the same effluents are shown in Table 1.

TABLE 1

| Level of addition of aqueous sodium hypochlorite solution (parts by weight) | Contents (ppm) | | | |
|---|---|---|---|---|
| | Sorbic acid | Other matter | BOD ppm | Elimination (%) |
| — (Effluent) | 3095 | 2680 | 9041 | — |
| 2.5 | 12 | 3132 | 4583 | 43 |
| 5.0 | Not detected | 3548 | 3940 | 51 |
| 10.0 | Not detected | 2591 | 3700 | 54 |

It is clear from Table 1 that as the effluent was treated with sodium hypochlorite, the BOD of the effluent was drastically reduced.

Example 2

The effluent from the same sorbic acid production line as in Example 1 was diluted with an approximately equal volume of water to provide Sample 1. In addition, the effluent from the same sorbic acid production line as above was treated with sodium hypochlorite in the same manner as in Example 1 (however, the level of addition of aqueous sodium hypochlorite solution was 5 parts by weight relative to 100 parts by weight of the effluent) to provide Sample 2.

Sample 1 and Sample 2 were respectively subjected to activated sludge treatment according to the standard protocol and the amounts of sorbic acid and other organic matter in the treated effluents and the BOD values of the effluents were determined. The results are presented in Table 2. The data are mean values during the treatment time.

TABLE 2

| | | Contents (ppm) | | | |
|---|---|---|---|---|---|
| | | Sorbic acid | Other matter | BOD ppm | Elimination (%) |
| Sample 1 | Before activated sludge treatment | 1485 | 1343 | 3870 | — |
| | After activated sludge treatment | — | — | 1064 | 72.5 |
| Sample 2 | Before activated sludge treatment | Not detected | 3587 | 3900 | — |
| | After activated sludge treatment | — | — | 125 | 96.8 |

It is apparent from Table 2 that the BOD elimination rate after activated sludge treatment was remarkably higher for Sample 2 than for Sample 1.

Example 3

Preparation of an effluent

To 100 parts by weight of the polyester obtained by reacting crotonaldehyde with ketene was added 380 parts by weight of concentrated hydrochloric acid, and the mixture was heated at 60° C. for 2 hours to decompose the polyester. This reaction mixture was cooled to room temperature to cause crude sorbic acid to separate out. The crude crystals thus obtained were recovered by filtration and rinsed with water. The filtrate and aqueous washes were combined to provide Effluent A.

To 100 parts by weight of the crude sorbic acid crystals obtained above was added 95 parts by weight of an aqueous solution containing 25 weight % of sodium hydroxide, and the mixture was heated with stirring to dissolve the crystals. The resulting solution was mixed with 5 parts by weight of activated carbon. The carbon was then filtered off, and the filtrate was adjusted to pH 2–3 with concentrated hydrochloric acid and cooled to room temperature, whereupon sorbic acid separated out. This crop of sorbic acid crystals was recovered by filtration and the filtrate was used as Effluent B.

The above Effluent A and Effluent B were blended in a weight ratio of A:B=1:9 and the mixture was regarded as the effluent from a sorbic acid production line and submitted to the following experiment.

Membrane separation

The above effluent (pH 2.6) from a sorbic acid production line was preadjusted to a predetermined pH with an aqueous solution of sodium hydroxide and fed to a membrane separation device equipped with a predetermined separation membrane at a rate of 10 L/m$^2$·H under a predetermined pressure.

Equipment

A: A flat membrane tester, built by Daisen Membrane System.

B: A spiral reverse osmosis device, built by Daisen Membrane Systems.

Separation membrane a: A nanofiltration membrane [MOLSEP® synthetic composite membrane DRA-40, NaCl elimination rate 40–45%]

b: A membrane for reverse osmosis [MOLSEP® synthetic composite membrane DRA-98, NaCl elimination rate 96–98%]

In Experiment 1, the above effluent was preadjusted to pH 10.1 and fed to Device A equipped with separation membrane a for separation at an operating pressure of 20 kgf/cm$^2$.

In Experiment 2, the above effluent was preadjusted to pH 10.1 and fed to Device B equipped with separation membrane b for separation at an operating pressure of 80 kgf/cm$^2$.

In Experiment 3, the above effluent was preadjusted to pH 5.2 and fed to Device A equipped with separation membrane a for separation at an operating pressure of 20 kgf/cm$^2$.

The concentration of sorbic acid and other organic matter in the downstream fluid, the BOD of the downstream fluid, the downstream fluid ratio (the ratio of the volume of downstream fluid to the volume of feed effluent), and the BOD concentration factor (by weight)=[(BOD (ppm) of upstream fluid×volume of upstream fluid)/(BOD (ppm) of downstream fluid×volume of downstream fluid)] are shown in Table 3. The BOD (ppm) of the upstream fluid was calculated by means of the following equation.

BOD (ppm) of upstream fluid=[feed BOD (g/H)−BOD (g/H) of downstream]/volume of upstream fluid (g/H)×106

TABLE 3

| | Contents (ppm) | | | Downstream fluid ratio | BOD concentration factor |
|---|---|---|---|---|---|
| | Sorbic acid | Other matter | BOD (ppm) | | |
| Effluent | 3480 | 3720 | 9300 | — | — |
| Experiment 1 | 520 | 1480 | 2230 | 4/5 | 17 |
| Experiment 2 | 515 | 1255 | 2100 | 2/3 | 11 |
| Experiment 3 | 2118 | 2380 | 5600 | 4/5 | 4 |

Biological treatment

The downstream fluid in the above membrane filtration step or the above-mentioned effluent, either as it was or after dilution with a given volume of water, was subjected to an activated sludge treatment according to the standard activated sludge treatment protocol (treatment time: 10 days) and the BOD elimination rate attributable to the activated sludge treatment was calculated. The results are shown in Table 4. The data are mean values during the treatment time. The feed to the activated sludge system in each experiment was as follows.

Experiment 4: the downstream fluid in Experiment 1 (Feed 1—1)

Experiment 5: the downstream fluid in Experiment 2 (Feed 2-1)

Experiment 6: said effluent (Feed 0-1)

Experiment 7: the solution prepared by diluting said effluent with about 3 volumes of water (Feed 0-2)

TABLE 4

| | Type of feed | Contents in feed (ppm) | | BOD of feed (ppm) | % BOD elimination |
|---|---|---|---|---|---|
| | | Sorbic acid | Other matter | | |
| Experiment 4 | 1-1 | 520 | 1480 | 2230 | 96.8 |
| Experiment 5 | 2-1 | 515 | 1255 | 2100 | 95.7 |
| Experiment 6 | 0-1 | 3480 | 3720 | 9300 | 70.9 |
| Experiment 7 | 0-2 | 950 | 980 | 2200 | 79.5 |

Example 4

Preparation of an effluent

To 100 parts by weight of the polyester obtained by reacting crotonaldehyde with ketene was added 380 parts by weight of concentrated hydrochloric acid, and the mixture was heated at 60° C. for 2 hours to decompose the polyester. This reaction mixture was cooled to room temperature to cause crude sorbic acid to separate out. The crude crystals thus obtained were recovered by filtration and rinsed with water. The filtrate and aqueous washes were combined to provide Effluent A.

To 100 parts by weight of the crude sorbic acid crystals obtained above was added 95 parts by weight of an aqueous solution containing 25 weight % of sodium hydroxide, and the mixture was heated with stirring to dissolve the crystals. The resulting solution was mixed with 5 parts by weight of activated carbon. The carbon was then filtered off, and the filtrate was adjusted to pH 2–3 with concentrated hydrochloric acid and cooled to room temperature, whereupon sorbic acid separated out. This crop of sorbic acid crystals was recovered by filtration, and the filtrate was used as Effluent B.

The above Effluent A and Effluent B were blended in a weight ratio of A:B=1:9 and the mixture was regarded as the effluent from a sorbic acid production line and submitted to the following experiment.

Activated carbon treatment

One-hundred (100) parts by weight of the above effluent from a sorbic acid production line was mixed with the following activated carbon with stirring at room temperature for 1 hour, and the carbon was then filtered off. The concentrations of sorbic acid and other organic matter in the filtrate, the BOD of the filtrate, and the BOD elimination rate are shown in Table 5.

Experiment 8: Shirasagi® (Takeda Chemical Industries, Ltd.); 1 part by weight

Experiment 9: Shirasagi® (Takeda Chemical Industries, Ltd.); 2 parts by weight

Experiment 10: Carboraffin® (Takeda Chemical Industries, Ltd.); 2 parts by weight When the granular activated carbon Shirasagi® KL, Shirasagi® X-7000, Shirasagi® LH2C, or Shirasagi® W2C (all from Takeda Chemical Industries, Ltd.) was used, too, the sorbic acid removal and BOD elimination effects were at least equivalent to the effects obtained in Experiments 8–10.

TABLE 5

| Experiment | Contents (ppm) | | BOD | |
|---|---|---|---|---|
| | Sorbic acid | Other matter | ppm | % Elimination |
| Effluent | 4050 | 5753 | 11000 | — |
| Experiment 8 | 786 | 3535 | 4367 | 60.3 |
| Experiment 9 | 12 | 1743 | 1991 | 81.9 |
| Experiment 10 | 69 | 2871 | 3113 | 71.7 |

It will be apparent from Table 5 that the activated carbon treatment of the effluent resulted in a drastic reduction in BOD.

Biological treatment

The filtrate after the above activated carbon treatment or the above-mentioned effluent, either as it was or after dilution with a given volume of water, was subjected to an activated sludge treatment according to the standard activated sludge treatment protocol (treatment time: 10 days) and the BOD elimination rate attributable to the activated sludge treatment was calculated. The results are shown in Table 6. The data are mean values during the treatment time. The solution supplied to the activated sludge system in each experiment was as follows.

Experiment 11: the filtrate obtained in Experiment 9 (Feed 9-1)

Experiment 12: the filtrate obtained in Experiment 10 (Feed 10-1)

Experiment 13: the solution prepared by diluting said effluent with about 2 volumes of water (Feed 0-3)

Experiment 14: said effluent (Feed 0-4)

TABLE 6

| Experiment (type of feed) | Activated sludge treatment | Contents (ppm) | | BOD | |
|---|---|---|---|---|---|
| | | Sorbic acid | Other matter | ppm | % Elimination |
| Experiment 11 (9-1) | Before | 13 | 1740 | 1930 | — |
| | After | — | — | 10 | 99.5 |
| Experiment 12 (10-1) | Before | 67 | 2880 | 3135 | — |
| | After | — | — | 97 | 96.9 |
| Experiment 13 (0-3) | Before | 1200 | 1720 | 3240 | — |
| | After | — | — | 654 | 79.8 |
| Experiment 14 (0-4) | Before | 4061 | 5740 | 11080 | — |
| | After | — | — | 3224 | 70.9 |

It will be apparent from Table 6 that when the effluent was subjected to activated carbon treatment and further to activated sludge treatment, the BOD elimination rate attributable to the activated sludge treatment was remarkably higher than the BOD elimination rate obtained when the same effluent was directly subjected to the activated sludge treatment.

What is claimed is:

1. A method of treating an effluent from the production of sorbic acid or its salt, the effluent containing sorbic acid and/or its salt which comprises a step of treating said effluent with a hypohalogenous acid or a salt thereof.

2. A method as claimed in claim 1 wherein the effluent treated with said hypohalogenous acid or salt thereof is further subjected to a biological treatment.

3. A method of reducing the BOD of an effluent from the production of sorbic acid or its salt, the effluent containing sorbic acid and/or its salt which comprises (1) treating said effluent with a hypohalogenous acid or a salt thereof, or (2) subjecting said effluent to membrane separation or activated carbon treatment and further to biological treatment.

4. The method as claimed in claim 1, wherein the hypohalogenous acid is at least one selected from the group consisting of hypochlorous acid, hypobromous acid and hypoiodous acid.

5. The method as claimed in claim 1, wherein the salt is at least one selected from the group consisting of sodium salt, potassium salt, calcium salt, strontium salt and barium salt.

6. The method as claimed in claim 1, wherein the hypohalogenous acid or salt thereof is present in 0.01–10 parts by weight of effective halogen based on 100 parts by weight of the effluent.

7. The method as claimed in claim 1, wherein the treating is performed at a temperature of about 0–60° C.

8. The method as claimed in claim 1, wherein the treating is performed from about 5 minutes to about 10 hours.

9. The method as claimed in claim 3, wherein the hypohalogenous acid is at least one selected from the group consisting of hypochlorous acid, hypobromous acid and hypoiodous acid.

10. The method as claimed in claim 3, wherein the salt is at least one selected from the group consisting of sodium salt, potassium salt, calcium salt, strontium salt and barium salt.

11. The method as claimed in claim 3, wherein the hypohalogenous acid or salt thereof is present in 0.01–10 parts by weight of effective halogen based on 100 parts by weight of the effluent.

12. The method as claimed in claim 3, wherein the treating as performed at a temperature of about 0–60° C.

13. The method as claimed in claim 3, wherein the treating is performed from about 5 minutes to about 10 hours.

14. The method as claimed in claim 3, wherein the membrane separation is performed with ultrafiltration membranes having a cutoff molecular weight of about 1,000–3,000,000.

15. The method as claimed in claim 3, wherein the membrane separation is performed with nanofiltration membranes having a cutoff molecular weight of about 200–2,000.

16. The method as claimed in claim 3, wherein the membrane separation is performed with reverse osmosis membranes having a cutoff molecular weight of about 60–350.

* * * * *